(12) United States Patent
Fischer

(10) Patent No.: US 9,834,370 B2
(45) Date of Patent: Dec. 5, 2017

(54) MAGAZINE FOR CAPSULES

(71) Applicant: Eugster / Frismag AG, Amriswil (CH)

(72) Inventor: Daniel Fischer, Romanshorn (CH)

(73) Assignee: Eugster / Frismag AG, Amriswil (CH)

( * ) Notice: Subject to any disclaimer, the term of this patent is extended or adjusted under 35 U.S.C. 154(b) by 95 days.

(21) Appl. No.: 14/767,817

(22) PCT Filed: Nov. 26, 2013

(86) PCT No.: PCT/EP2013/074719
§ 371 (c)(1),
(2) Date: Aug. 13, 2015

(87) PCT Pub. No.: WO2014/127863
PCT Pub. Date: Aug. 28, 2014

(65) Prior Publication Data
US 2015/0375926 A1    Dec. 31, 2015

(30) Foreign Application Priority Data
Feb. 19, 2013    (DE) .................. 10 2013 202 677

(51) Int. Cl.
*A47J 31/40* (2006.01)
*B65D 85/62* (2006.01)
*A47J 31/36* (2006.01)

(52) U.S. Cl.
CPC .......... *B65D 85/62* (2013.01); *A47J 31/3642* (2013.01); *A47J 31/407* (2013.01)

(58) Field of Classification Search
CPC ...... A47J 31/3642; A47J 31/407; B65D 85/62
USPC ............. 99/275, 279, 287, 289 R, 290, 295; 221/1, 11, 13, 81, 93, 115, 119
See application file for complete search history.

(56) References Cited

U.S. PATENT DOCUMENTS

| | | | |
|---|---|---|---|
| 4,920,870 | A | 5/1990 | Newman et al. |
| 4,975,296 | A | 12/1990 | Newman et al. |
| 2004/0089158 | A1 | 5/2004 | Mahlich |
| 2004/0129145 | A1 | 7/2004 | Denisart et al. |

(Continued)

FOREIGN PATENT DOCUMENTS

| | | |
|---|---|---|
| EP | 0334573 A1 | 9/1989 |
| EP | 1247481 A1 | 10/2002 |

(Continued)

OTHER PUBLICATIONS

International Search Report, Application No. PCT/2013/074719 dated Mar. 26, 2014.

*Primary Examiner* — Thien S Tran
(74) *Attorney, Agent, or Firm* — The Dobrusin Law Firm P.C.

(57) ABSTRACT

The invention relates to a magazine unit for fitting a brewing device with a portion capsule. The magazine has a storage magazine for storing portion capsules, said portion capsules being stacked one after the other in a stacking direction, and the magazine unit has a transporting means for transporting a portion capsule out of the storage magazine into the brewing device. The transporting means can be pivoted about a pivot axis between a removal position for removing the portion capsule from the storage magazine and a dispensing position for fitting the brewing device with the portion capsule, said pivot axis being perpendicular to the stacking direction.

19 Claims, 5 Drawing Sheets

(56) References Cited

U.S. PATENT DOCUMENTS

| | | | |
|---|---|---|---|
| 2005/0000366 A9 | 1/2005 | Denisart et al. | |
| 2008/0245820 A1* | 10/2008 | Pfister | G07F 11/04 221/1 |
| 2010/0206177 A1* | 8/2010 | Ricotti | A47J 31/0673 99/295 |
| 2013/0186908 A1* | 7/2013 | Magno | A47J 31/3642 221/13 |
| 2013/0206012 A1 | 8/2013 | Morin et al. | |

FOREIGN PATENT DOCUMENTS

| | | |
|---|---|---|
| EP | 1310199 A1 | 5/2003 |
| EP | 1379153 B1 | 3/2006 |
| EP | 2301394 A1 | 3/2011 |
| EP | 2554081 A1 | 2/2013 |
| FR | 2907766 A1 | 5/2008 |
| FR | 2940754 A1 | 7/2010 |
| WO | 2013018066 A1 | 2/2013 |

\* cited by examiner

MAGAZINE FOR CAPSULES

PRIOR ART

The present invention relates to a magazine unit for providing a brewing device with a portion capsule, wherein the magazine unit has a storage magazine for storing portion capsules, wherein the portion capsules are stacked one after the other in a stacking direction, wherein the magazine unit has a transport means for transporting a portion capsule from the storage magazine into the brewing device.

It is known to produce drinks, such as coffee, from portion capsules which contain ground and roasted coffee at a specific measure. The use of portion capsules has with respect to conventional drink preparation the advantage that the operating steps of the drink preparation are facilitated, a clean preparation without visible residue of coffee grounds is ensured and the metering and the quality of the prepared product complies with the highest requirements and can be controlled in a reproducible manner.

EP1379153 B1 discloses, for example, a magazine unit having a reading device for detecting an identification on a portion unit which contains coffee grounds. The known magazine unit substantially comprises a rotary plate, on which magazine tubes are secured in a substantially circular arrangement. Each of the magazine tubes is suitable for receiving a stack of portion capsules which have their bases directed downward, each of the magazine tubes receiving portion capsules of one of a plurality of coffee types which are available. Each of the magazine tubes has adjacent to the outer edge of the rotary plate a magazine tube discharge opening through which the lowermost portion capsule in each case can be pushed out of the magazine tube which has been rotated into a removal, position.

There is further known from EP1310199 A1, for example, a device for drink preparation from a capsule which contains a substance which is intended to be extracted in an extraction system of the device. The device has a gripper for gripping a pre-selected capsule in the storage system. The gripper comprises a closure plate, which is provided with an opening which is sufficient for the free passage of a capsule which is located opposite it. Below this plate there is a jaw pair which is securely connected to the closure plate with which it moves about a central rotation axis which is parallel with the axis of a carousel of the storage system and which is offset relative thereto. The gripper can be moved on a circular path which intersects with the first circular path of the storage system. The significant gripping elements, which are the opening and the jaws, can be moved together on the path so that they are located opposite the passage of the pipe carrier plate at the time of the gripping action.

The disadvantage of such devices is that such known devices are comparatively complex to produce and have a large number of components which cooperate in a complex manner. The production of the magazine unit thereby becomes comparatively expensive. Furthermore, such devices have a high degree of wear and therefore have a short service-life. Furthermore, as a result of the comparatively complex operation and maintenance, the user-friendliness is significantly decreased.

STATEMENT OF INVENTION

An object of the invention is therefore to provide a magazine unit which is for providing a brewing device with a portion capsule and which does not have the disadvantages of the prior art and is simpler and more cost-effective to produce in comparison with the prior art, and which improves the user-friendliness, increases the service-life and reduces the maintenance complexity.

This object is achieved according to the invention by a magazine unit for providing a brewing device with a portion capsule, wherein the magazine unit has a storage magazine for storing portion capsules, wherein the portion capsules are stacked one after the other in a stacking direction, wherein the magazine unit has a transport means for transporting a portion capsule from the storage magazine into the brewing device, wherein the transport means can be pivoted about a pivot axis which is arranged perpendicularly to the stacking direction between a removal position for removing the portion capsule from the storage magazine and a discharge position for providing the brewing device with the portion capsule.

Advantageously, as a result of the use of such a transport means which is supported so as to be able to be pivoted between the removal position and the discharge position, a magazine unit which can be produced with comparatively simple means is provided. The transport means can thereby be used both for isolating the stack of portion capsules and for transporting the portion capsule from the storage magazine to the brewing device. The magazine unit is provided in particular for use with rotationally symmetrical portion capsules which have a capsule lid and a capsule base. In particular, the capsule lid has a main extent plane parallel with another main extent plane of the capsule base. Preferably, the portion capsule falls in the removal position in the stacking direction from the storage magazine into a capsule receiving member of the transport means so that the portion capsule comes to rest with the capsule base in a downward direction—that is to say, in the direction of the gravitational field of the earth—in the capsule receiving member. The transport means is in particular constructed in such a manner that the portion capsule is also moved by the pivot movement of the transport means about the pivot axis which is perpendicular relative to the stacking direction. In particular, the capsule receiving member is constructed in such a manner, for example, by means of a recess, that the portion capsule in the discharge position falls out of the capsule receiving member parallel with the stacking direction or the gravitational field of the earth in such a manner that the main extent plane of the capsule cover or the main extent plane of the capsule base are orientated in each case parallel with the gravitational field of the earth, this position of the capsule being referred to below as the capsule receiving position.

This is particularly advantageous because the magazine unit can be used together with a brewing device which can receive the portion capsule only in the capsule receiving position. In particular, such a brewing device has a first brewing chamber element and a second brewing chamber element for extracting the portion capsule, the first brewing chamber element and/or the second brewing chamber element being movable in an axial direction, which is in particular perpendicular to the stacking direction, between a loading position in which the first and second brewing chamber element are spaced apart from each other, and an extraction position, in which the first and the second brewing chamber element form a substantially closed brewing chamber. In the loading position, such a brewing device is particularly configured to receive the portion capsule in the capsule receiving position.

The pivot movement of the transport means from the removal position to the discharge position is brought about in particular counter to the pivot movement of the transport means from the discharge position into the removal position.

Alternatively, there is also provision for a pivot movement of the transport means in only one pivot direction, that is to say, either in the clockwise direction or in the counter-clockwise direction. In an embodiment of the magazine unit with pivoting of the transport means in only a single pivot direction, the transport means particularly has a plurality of capsule receiving members, preferably two capsule receiving members.

In particular, the transport means has an examination device for identifying marking information, the marking information being arranged on the portion capsule, in particular on the capsule base. In particular, the marking information is a portion capsule code, a portion capsule identification and/or a quick response (QR) code.

According to a preferred development of the present invention, there is provision for the storage magazine to have a plurality of magazine tubes which are arranged on a carrier, in particular a rotary plate, wherein a magazine tube is provided for stacking the portion capsules in the stacking direction, wherein the magazine tubes are selectively movable with the carrier into a transfer position, wherein the carrier has a permeable portion under each magazine tube, wherein the transport means for transporting the lowermost portion capsule from the storage magazine to the brewing device is arranged under the permeable portion in the transfer position.

It is thereby advantageously possible to accommodate a large number of different coffee types in the individual magazine tubes and to selectively position a magazine tube which contains the desired coffee type above the transport means. It is thereby possible to provide the brewing device with the selected coffee type. By a plurality of magazine tubes being arranged on a rotary plate, it is further particularly advantageously possible to accommodate a large number of portion capsules in the storage magazine of the magazine unit so that the storage magazine has to be refilled with new portion capsules in a comparatively rare manner.

In particular, the rotary plate is rotatably arranged about a rotation axis which extends in particular through a center point of the rotary plate with respect to a base plate, the base plate particularly having an additional permeable portion. The base plate is also referred to below as an additional carrier. In particular, the magazine tubes are arranged on the rotary plate in a circular manner around the rotation axis. It is thereby advantageously possible for one magazine tube of the magazine tubes which are arranged in a circular manner on the rotary plate to be selectively able to be positioned in the transfer position by means of a rotational movement of the rotary plate above the additional permeable portion of the base plate. In particular, a permeable portion is arranged under each magazine tube so that, in the transfer position, the permeable portion under the selected magazine tube and the additional permeable portion parallel with the stacking direction are arranged one above the other in such a manner that the portion capsule can be moved through the permeable portion and the additional permeable portion.

According to a preferred development of the present invention, there is provision for the transport means to have a recess for receiving the portion capsule, wherein the recess is particularly constructed to receive precisely one portion capsule, wherein the recess has a depositing means, in particular a depositing face, for depositing the portion capsule in the removal position and a carrier means, in particular a carrier face, for carrying the portion capsule during a pivot movement of the transport means into the discharge position.

It is thereby advantageously possible to provide a compact and stable transport means, in particular in the form of a drum, so that there is thereby provided a magazine unit having a comparatively long service-life, low maintenance complexity and a high level of user-friendliness.

According to a preferred development of the present invention, there is provision for the transport means to have a retention means for retaining the subsequent portion capsule in the storage magazine, wherein the retention means is particularly an outer side of the transport means, wherein the transport means is arranged in such a manner that the subsequent portion capsule in the storage magazine is positioned on the retention means of the transport means when the transport means is not in the removal position.

It is thereby advantageously possible to use a single transport means both for transporting the portion capsule from the storage magazine into the brewing device and simultaneously for isolating the stacked portion capsules of the storage magazine. A complex construction of the magazine unit and/or high costs during the production owing to comparatively complex components are thereby advantageously avoided. Since the transport means which is in particular in the form of a drum is compact and stable in comparison with the prior art, a magazine unit having a comparatively long service-life, low maintenance complexity and a high level of user-friendliness is thereby provided. The outer side is in particular a covering face of a transport means in the form of a drum.

According to a prefer red development of the present invention, there is provision for the transport means to be constructed in a drum-like manner, wherein the outer side is a covering face of the transport means for retaining the subsequent portion capsule in the storage magazine, wherein the recess has a carrier means which is constructed as a carrier face and a depositing means which is constructed as a depositing face.

It is thereby advantageously possible to provide a magazine unit which operates reliably and which has a comparatively long service-life with comparatively low material costs.

According to a preferred development of the present invention, there is provision for the recess to be constructed in such a manner that the carrier face delimits the depositing face toward one side, wherein the transport means has an opening along the depositing face at the side opposite with respect to the carrier face in order to discharge the portion capsule to the brewing device in the discharge position.

It is thereby advantageously possible to use the magazine unit in combination with a brewing device which is configured to receive the portion capsule in a loading direction which is parallel with the gravitational field of the earth, the portion capsule having to be supplied to the brewing device in a capsule receiving position. In the capsule receiving position, the portion capsule has main extent planes of the capsule cover and/or capsule base which are orientated parallel with the gravitational field of the earth.

According to another aspect of subject-matter or a preferred development of the present invention, there is provided a brewing system having a magazine unit and a brewing device having a brewing chamber for extracting and/or releasing a substance, in particular coffee, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

It is thereby advantageously possible to provide the brewing device with a large number of different coffee types in an automatic manner. A stable brewing system having a comparatively long service-life is thereby particularly provided. In a particularly advantageous manner, this is achieved by the comparatively stable and compact transport means because the transport means can be used both for isolating the stack of portion capsules and simultaneously for transporting the removed portion capsule from the storage magazine to the brewing device.

According to another aspect of subject-matter, a method for providing a brewing device with a portion capsule is provided, wherein in a first method step portion capsules are stacked in a storage magazine for storage in a stacking direction, wherein in a second method step a portion capsule is retained by an outer side of the transport means in the storage magazine, wherein in a third method step the portion capsule is moved in a removal position of the transport means into a recess of the transport means, wherein in a fourth method step the portion capsule is moved into a brewing chamber of the brewing device in a discharge position of the transport means in order to charge the brewing device, wherein the transport means is pivoted about a pivot axis which is arranged perpendicularly to the stacking direction between the removal position and the discharge position.

It is thereby advantageously possible to automatically provide the brewing device with a large number of different coffee types. In particular, there is thereby provided a method which advantageously uses a transport means both for isolating the stack of portion capsules and simultaneously for transporting the removed portion capsule from the storage magazine to the brewing device. It is thereby advantageously possible to provide a brewing device with a portion capsule, the brewing device having a brewing chamber for extracting and/or releasing a substance, in particular coffee, which is provided in the portion capsule, the brewing chamber having a first brewing chamber element and a second brewing chamber element and the first brewing chamber element being movable in an axial direction between a loading position, in which the first and the second brewing chamber element are spaced apart from each other, and an extraction position, in which the first and the second brewing chamber element are moved toward each other in order to form a substantially closed brewing chamber, the axial direction particularly being a horizontal direction which is arranged perpendicularly to the gravitational field of the earth. In particular the portion capsule can be supplied to such a brewing device only in a loading direction which is arranged parallel with the stacking direction or perpendicularly to the horizontal direction. In particular, the portion capsule is constructed in a rotationally symmetrical manner with respect to a center axis, the center axis extending in particular along a straight line which connects the capsule base and the capsule cover. The portion capsule is moved by the transport means as a result of the pivot movement of the transport means from the removal position into the discharge position in particular in such a manner that the center axis is arranged in the discharge position perpendicularly to the loading direction of the brewing device so that the brewing device can receive the portion capsule.

According to a preferred development of the present invention, there is provision for the subsequent portion capsule to be simultaneously retained by the outer side of the transport means during the pivot movement of the transport means between the removal position and the discharge position.

It is thereby advantageously possible to use a single transport means both for transporting the portion capsule from the storage magazine into the brewing device and simultaneously for isolating the stacked portion capsules of the storage magazine. A complex construction of the magazine unit and/or high costs during the production owing to comparatively complex components are thereby advantageously avoided. Since the transport means which is in particular in the form of a drum is compact and stable in comparison with the prior art, a magazine unit having a comparatively long service-life, low maintenance complexity and a high level of user-friendliness is thereby provided. The outer side is in particular a covering face of a transport means in the form of a drum.

According to a preferred development of the present invention, there is provision for the portion capsule to be moved in the third method step into the recess of the transport means in such a manner that the portion capsule comes to rest with the capsule base on a depositing means, in particular a depositing face, of the recess, wherein the portion capsule is guided during the pivot movement from the removal position into the discharge position by a carrier means of the transport means, in particular a carrier face.

It is thereby advantageously possible to use the magazine unit in combination with a brewing device which is configured to receive the portion capsule in a loading direction which is parallel with the gravitational field of the earth, the portion capsule having to be supplied to the brewing device in a capsule receiving position. In the capsule receiving position, the portion capsule has main extent planes of the capsule cover and/or capsule base, which planes are orientated parallel with the gravitational field of the earth.

Additional details, features and advantages of the invention will be appreciated from the drawings and from the following description of preferred embodiments with reference to the drawings. The drawings illustrate merely exemplary embodiments of the invention which do not limit the significant notion of the invention.

EMBODIMENTS OF THE INVENTION

Figure 1:
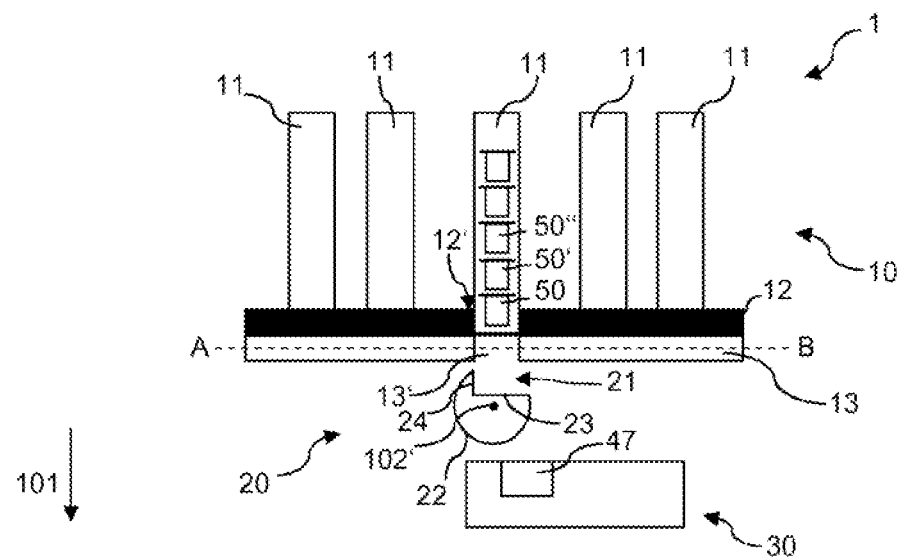
FIG. 1 is a schematic cross-section of a brewing system according to a first embodiment of the present invention.

In the different Figures, identical components are always indicated with the same reference numerals and are therefore generally also mentioned or set out only once.

FIG. 1 is a schematic cross-section of a brewing system 1 according to a first embodiment of the present invention. The brewing system 1 is illustrated along the line of section A-B (cf. FIG. 2). The brewing system 1 has a magazine unit 10, 20 having a storage magazine 10 and a transport means, and a brewing device 30. Portion capsules 50, 50', 50" are arranged in a stacked state in the storage magazine 10 in a stacking direction 101 which extends in particular parallel with the gravitational field of the earth 101.

In order to stack the portion capsules 50, 50', 50", the storage magazine 10 has in particular a plurality of magazine tubes 11 which are of identical construction. The portion capsules 50, 50' 50" are stacked in each magazine tube 11 in such a manner that the capsule base 51 of a portion capsule 50, 50', 50" is arranged under the capsule cover 54 in the direction of the gravitational field of the earth 101. In particular, the storage magazine 10 has a carrier 12, in particular a rotary plate 12, on which the magazine tubes 11 are fixedly fitted. The rotary plate is supported in particular so as to be rotatable about a rotation axis 101' so that the magazine tubes 11 can be moved together with the carrier. Under each magazine tube 11, the carrier 12 has a permeable neckline 12' which is provided for the removal of the portion capsule 50, 50', 50" from the storage magazine 11, in particular from the magazine tube 11 which is positioned above an additional permeable portion 13'. To this end, there is arranged under the carrier 12 in particular an additional carrier 13 having the additional permeable portion 13' which closes the permeable openings 12' under the magazine tubes 11 which are not located above the additional permeable opening 13' of the additional carrier 13. Furthermore, by means of a rotational movement of the carrier 12 with respect to the additional carrier 13, a selected magazine tube 11 of the plurality of magazine tubes 11 is positioned above the additional permeable portion 13' that it is possible to remove the lowermost capsule 50, 50', 50" from the selected magazine tube 11. It is thereby particularly advantageously possible to provide the magazine tubes 11 each with portion capsules 50, 50', 50" containing different coffee types and to select a specific coffee type by means of the rotational movement of the carrier 12.

Furthermore, the transport means 20 is arranged in the stacking direction 101 or in the direction of the gravitational field of the earth 101 under the carrier 12, in particular under the additional permeable opening 13' of the additional carrier 13. The transport means 20 is arranged so as to be pivotable about a pivot axis 102' between a removal position and a discharge position. In the removal position, in particular precisely one lowermost portion capsule 50 can be moved out of the magazine tube in the stacking direction 101 or in the direction of the gravitational field of the earth 101 into a recess 21 of the transport means 20, in particular as a result of the action of force of the gravitational field of the earth. The recess 21 is particularly constructed in such a manner that the portion capsule 50 is positioned with the capsule base 51 (see FIG. 3) on a depositing means 23 of the recess 21 after the removal operation. In particular, the recess 21 further has a carrier means 24, the carrier means 24 being constructed in such a manner that the portion capsule 50 is also moved with the transport means 20 by means of a pivot movement of the transport means 20 about the pivot axis 102'—in the clockwise direction in FIG. 1. In particular, the transport means 20 is preferably pivoted through an angle between 30 and 150 degrees, preferably between 60 and 120 degrees, very particularly preferably through 90 degrees, in order to cause the portion capsule 50 to fall out of the recess 21 of the transport means 20. Furthermore, the recess 21 is particularly constructed in such a manner that the portion capsule 50 is conveyed out of the recess in the discharge position in such a manner that the main extent plane of the capsule cover 54 and/or the capsule base 51 is orientated parallel with the gravitational field of the earth 101. In this instance, the portion capsule 50 is moved into such a capsule receiving position (see FIG. 5) that the portion capsule 50 can be supplied to a supply opening 47 of the brewing device 30, the brewing device being configured only to receive portion capsules 50, 50', 50" in a loading direction 101 which is parallel with the gravitational field of the earth 101.

Figure 2:
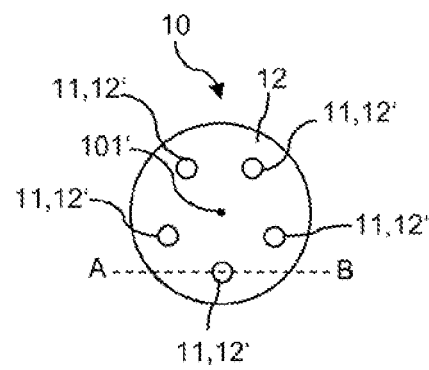
FIG. 2 is a schematic plan view of a magazine unit according to a second embodiment of the present invention.

FIG. 2 is a schematic top view of a magazine unit 10 according to a second embodiment of the present invention. The magazine unit 10 has a plurality of magazine tubes 11 which are arranged on a circular path on a carrier 12 which is constructed as a rotary plate 12. In a particularly preferable manner, the rotary plate has in particular 15 magazine tubes 11, the plate diameter being 320 mm. In particular, each magazine tube 11 is configured to receive preferably 32 portion capsules. In a selective manner, a magazine tube 11 is positioned above the transport means 20 in order to remove a portion capsule 50, 50', 50" from the selected magazine tube 11 by means of a rotational movement of the carrier 12 about the rotation axis 101' which is parallel in particular with the stacking direction 101 and/or the gravitational field of the earth 101.

Figure 3:
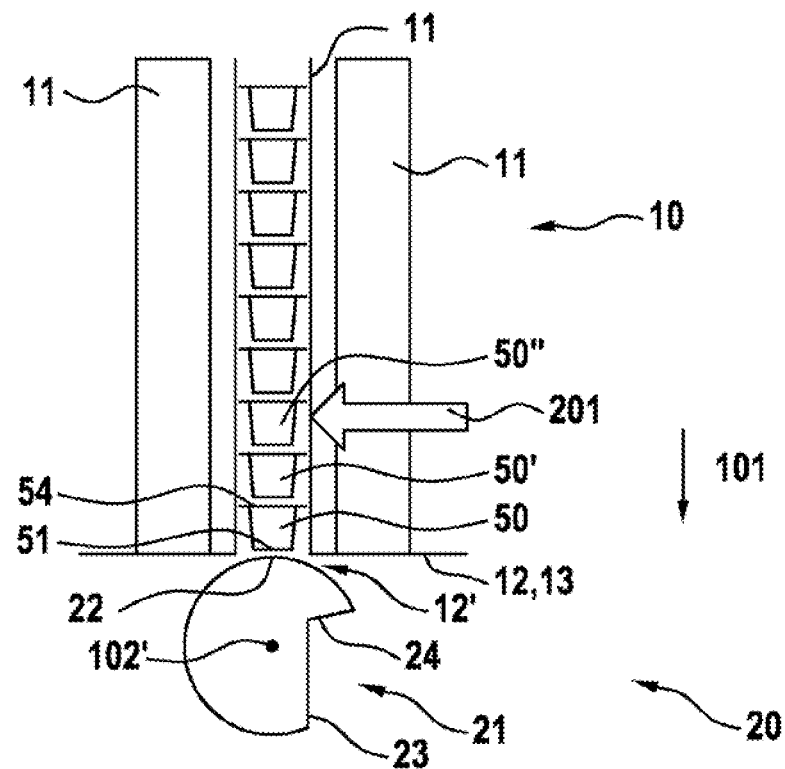
FIGS. 3 to 5 are schematic cross-sections of a magazine unit according to a third embodiment of the present invention.
Figure 4:
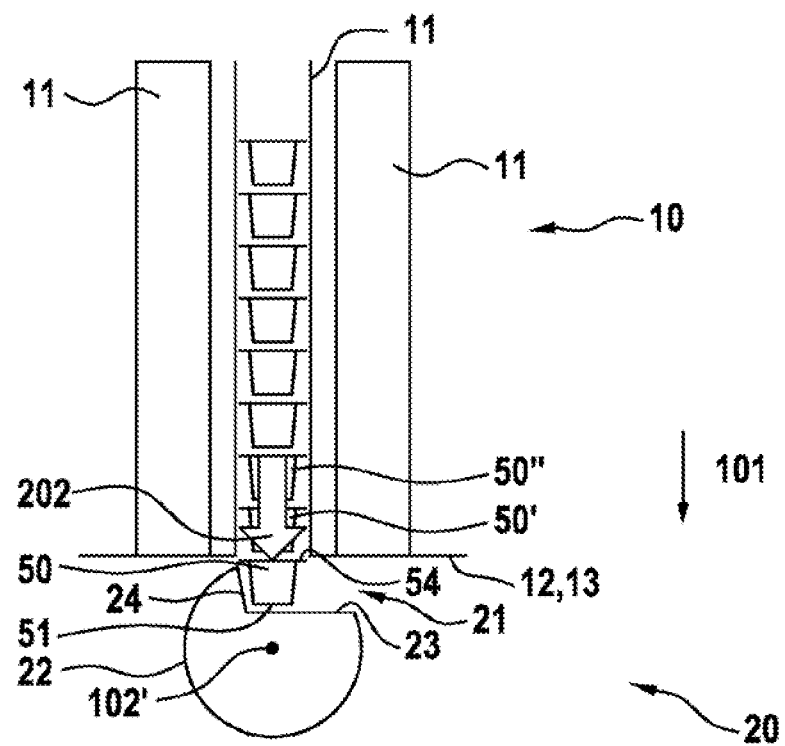
Figure 5:
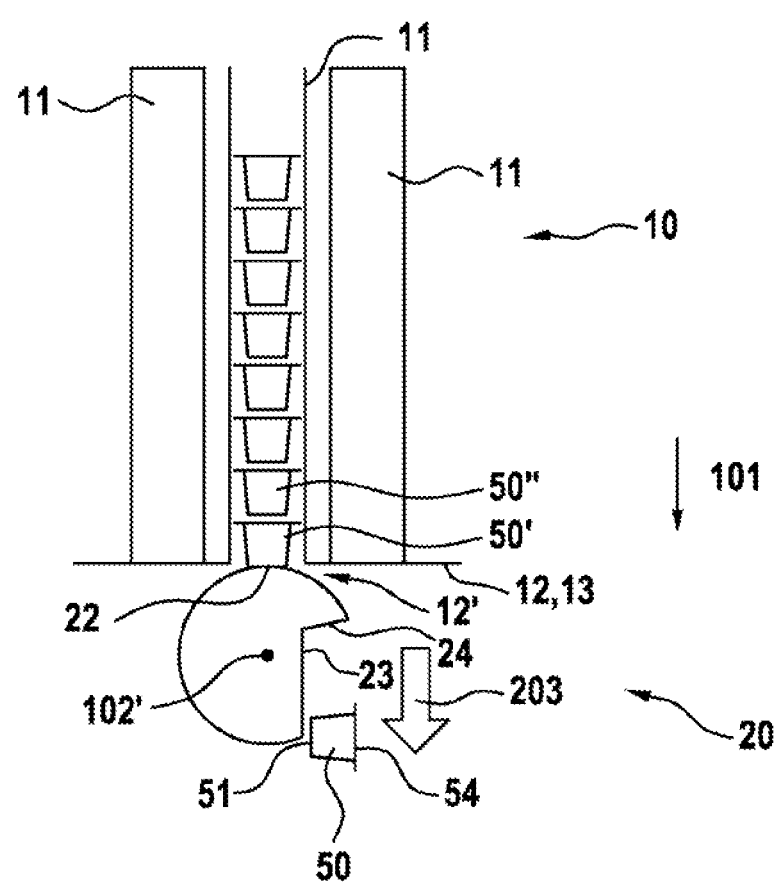

FIGS. 3 to 5 are schematic cross-sections of a magazine unit 10 according to a third embodiment of the present invention. The magazine unit 10 has a plurality of magazine tubes 11 in order to stack portion capsules 50, 50', 50", etcetera, in a stacking direction 101 which is parallel with the direction of the gravitational field of the earth 101. The portion capsules 50, 50', 50" are stacked inside a magazine tube 11 with the capsule base 51 downward. The plurality of magazine tubes 11 are arranged on a rotationally movable carrier 12, the carrier 12 having a permeable opening 12' under each magazine tube. In a selective manner, a magazine tube 11 of the plurality of magazine tubes can be positioned above the transport means 20 by means of a rotational movement of the carrier 12 about a rotation axis 101' parallel with the stacking direction 101. The carrier 12 is rotatably supported in particular with respect to an additional carrier 13, the additional carrier 13 in particular having an additional permeable opening 13' (see FIG. 1) at the location of the transport means. The transport means 20 has a capsule receiving member 21 having a depositing means 23 and a carrier means 24. The transport means further has a retention means 22 in order to retain the portion capsules 50, 50', 50" in the magazine tube 11 of the storage magazine 10. In a particularly preferable manner, the transport means 20 is constructed in particular as a drum 20, the drum 20 having a retention means 22 which is constructed as a covering face 22 and being arranged so as to be pivotable about a pivot axis which is in particular perpendicular to the stacking direction 101. By means of a pivot movement, the drum 20 can be pivoted between a removal position, in which the lowermost portion capsule 50 can be removed from the magazine tube 11, and a discharge position, in which a removed portion capsule 50 can be conveyed out of the transport means 20. Furthermore, the transport means 20 or the drum 20 in particular has a capsule receiving member 21 which is constructed as a recess 21, the depositing means 23 being constructed as a depositing face 23 and the carrier means 24 being constructed as a carrier face 24. The recess 23 is constructed in particular in such a manner that the portion capsule 50, 50', 50" can be moved in the removal position with the capsule base 51 positioned on the depositing face and can be moved into the brewing device in the discharge position at a side opposite the carrier face 24 along the depositing face 23 in the direction of the stacking direction 101 or the gravitational field of the earth 101. As illustrated in FIG. 1, a brewing device 30 is preferably arranged in order to receive the portion capsule in the brewing device 30 in particular under the transport means 20 of the magazine unit 10 which is illustrated in FIGS. 3 to 5.

FIG. 3 illustrates the transport means 20 in a discharge position. In particular, the transport means 20 is constructed as a drum 20, the drum 20 having a covering face 22 as a retention means 22. Initially, a magazine tube is selectively positioned by means of the rotational movement of the carrier 12 in the region of the transport means 20, for example, in an advance direction 201 indicated by an arrow, above the transport means 20. In FIG. 3, the transport means 20 is in the discharge position, the lowermost portion capsule 50 of the magazine tube 11 being retained by the retention means 22 by the capsule base 51 of the lowermost portion capsule 50 being positioned on the retention means. In order to transfer the transport means 20 into the removal position in order to remove the lowermost portion capsule 50 from the magazine tube 11, the transport means is pivoted by means of a pivot movement—in the example of FIG. 3, through 90 degrees in a counter-clockwise direction—out of the discharge position into the removal position. While the transport means 20 is pivoted from the discharge position into the removal position, the retention means 22—in FIG. 3, the covering face 22 of the drum 20—slides along the capsule base 51 of the lowermost portion capsule 50 until the transport means 20 reaches the removal position.

FIG. 4 shows the transport means 20 in the removal position. The lowermost portion capsule 50 falls as a result of the action of force of the gravitational field of the earth in the direction of the gravitational field of the earth 101, in particular parallel with the stacking direction 101, into the capsule receiving member 21 of the transport means 20, which member is in the form of a recess 21. This is illustrated in FIG. 4 by the arrow 202. In this instance, the received portion capsule 50 is positioned with the capsule base 51 on the depositing means 23, in particular the depositing face 23, of the capsule receiving member 21. When the transport means 20 is subsequently pivoted from the removal position into the discharge position, the received portion capsule 50 is guided by the carrier means 24 in such a manner that the capsule base 51 of the portion capsule 50 remains on the depositing means 23 until the portion capsule 50 falls out of the transport means 20, in particular into the brewing device 30 arranged under the transport means. At the same time, during the pivoting of the transport means 20 from the removal position into the discharge position, the subsequent portion capsule 50' is retained in the magazine tube 11 by the retention means 22 of the transport means 20, in particular in the manner described in FIG. 3.

FIG. 5 illustrates the transport means 20 in the discharge position, the removed portion capsule 50 being moved out of the capsule receiving member 23 in the direction of the gravitational field of the earth 101. This is indicated by the arrow 203 in FIG. 5. The capsule receiving member has an opening in particular at the side opposite the carrier face 24 along the depositing face 23 so that the capsule in the capsule receiving position—that is to say, with the main extent plane of the capsule base 51 and/or capsule cover 54 in a state orientated parallel with the gravitational field of the earth—is moved out of the capsule receiving member 21 by the action of force of the gravitational field of the earth in the manner set out. At the same time, the subsequent capsule 51' is retained inside the magazine tube 11 by the retention means 22 of the transport means 20. A magazine unit which can be used in particular in combination with a brewing device which receives a portion capsule in only one loading direction 101 parallel with the direction of the gravitational field of the earth 101 is thereby provided with comparatively simple means.

Figure 6:
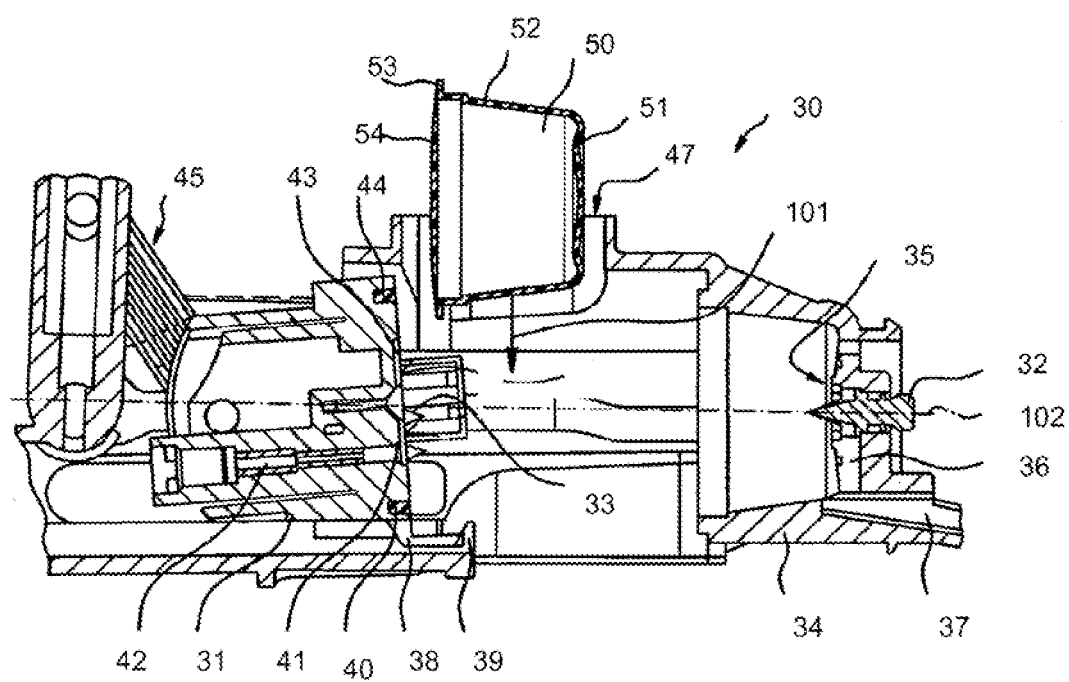
FIGS. 6 and 7 are schematic cross-sections of a brewing device of a brewing system according to a fourth embodiment of the present invention.
Figure 7:
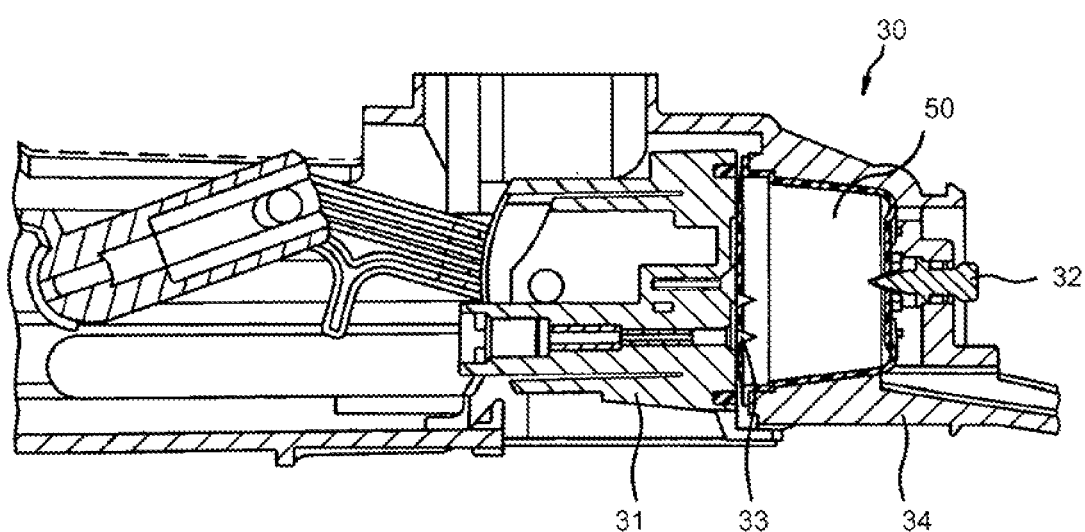

FIGS. 6 and 7 are schematic cross-sections of a brewing device of a brewing system according to a fourth embodiment of the present invention.

FIG. 6 illustrates the first brewing chamber element 31 in the loading position, the first brewing chamber element 31 being spaced apart from the second brewing chamber element 34 in the axial direction 102. In this initial position, the portion capsule 50 is introduced in a loading direction 101 by the transport means 20 of the magazine unit 10, 20. To this end, a housing of the brewing device 30, which housing is constructed as part of the second brewing chamber element 34, has a supply opening 47, through which the portion capsule 50 is introduced. The portion capsule 50 is preferably constructed in a rotationally symmetrical manner and has a frustum of a cone 52 between the capsule base 51 and the capsule cover 54.

In FIG. 7, the first brewing chamber element 31 is displaced as far as the second brewing chamber element 34 in the axial direction 102 into the extraction position by means of the articulated lever joint 45 so that the portion capsule 50 is introduced almost completely into the hollow bell-like element 34 and the capsule base 51 is perforated by the second perforation means 32 which is constructed as a piercing mandrel 32. Consequently, the first brewing chamber element 31 and the second brewing chamber element 34 form a hermetically closed brewing chamber 31, 34, in which the portion capsule 50 is arranged. A capsule flange 53 of the portion capsule 50 is securely clamped between the first brewing chamber element 31 and the second brewing chamber element 34, in particular by means of a resilient sealing ring 44.

In this position, the extraction operation is started, that is to say, extraction fluid in the form of pressurized and heated water is supplied to the brewing chamber 31, 34. The extraction fluid is conveyed through the water supply channel 42 and the formation 41 to the water discharge openings and reaches the portion capsule 50 at that location through the perforation openings in the capsule cover 54 which are produced by means of the first perforation means 33 of a perforation element 43. The extraction fluid flows through the drinks substance so that there is formed a drinks extract which leaves the portion capsule 50 again through the perforation hole which is produced by means of the piercing mandrel 32 in the capsule base 51 and which reaches the discharge channel. 37 through the recess 36. The drinks extract is preferably supplied directly by means of the discharge channel 37 to a drinking vessel, such as a coffee cup, which is not illustrated.

After the extraction operation, the first brewing chamber element 31 is moved away from the second brewing chamber element 34 so that the portion capsule 50 is initially also moved with the first brewing chamber element 31 until the portion capsule 50 is moved out of the brewing device in the loading direction by an ejection member which is fitted to the housing. The used portion capsule 50 is also withdrawn again from the first brewing chamber element 31 until the capsule flange 53 moves into contact with the ejection member 30. The capsule is thereby brought out of engagement with the capsule retention means 38 and automatically falls under the action of gravitational force out of the region between the first brewing chamber element 31 and the second brewing chamber element 34.

LIST OF REFERENCE NUMERALS

1 Brewing system
10, 20 Magazine unit

10 Storage magazine
11 Magazine tube
12 Carrier/rotary plate
12' Permeable portion
13 Additional carrier
13' Additional permeable portion
20 Transport means/drum
21 Recess
22 Retention means/outer side/covering face
23 Depositing means/depositing face
24 Carrier means/carrier face
30 Brewing device
31 First brewing chamber element
32 Second perforation element
33 First perforation means
34 Second brewing chamber element
35 Base region
36 Recess
37 Discharge channel
38 Capsule retention means
39 Ejection member
40 Finger
41 Formation
42 Water supply channel
43 Perforation element
44 Sealing ring
45 Articulated lever joint
46 Surface region
47 Supply opening
50, 50', 50" Portion capsule
51 Capsule base
52 Frustum of a cone
53 Capsule flange
54 Capsule cover
101 Stacking direction/loading direction/gravitational field
101' Rotation axis
102 Advance direction/axial direction
102' Pivot axis

What is claimed is:

1. A magazine unit for providing a brewing device with a portion capsule comprising:
   (a) a storage magazine for storing portion capsules, wherein the portion capsules are stacked one after the other in a stacking direction, and
   (b) a transport means for transporting a portion capsule from the storage magazine into the brewing device,
   the transport means is pivotable about a pivot axis which is arranged perpendicularly to the stacking direction,
   wherein the transport means has a recess for receiving a portion capsule, wherein the transport means is constructed in a drum-like manner,
   wherein there is an outer side which is a covering face of the transport means in order to retain a subsequent portion capsule in the storage magazine,
   wherein the recess has a carrier means which is constructed as a carrier face and a depositing means which is constructed as a depositing face,
   wherein the storage magazine has a plurality of magazine tubes which are arranged on a carrier,
   wherein a magazine tube is provided for stacking the portion capsules in the stacking direction,
   wherein the magazine tubes are selectively movable with the carrier into a transfer position,
   wherein the carrier has a permeable portion under each magazine tube, and
   wherein the transport means for transporting a lowermost portion capsule from the storage magazine to the brewing device is arranged under the permeable portion in the transfer position.

2. The magazine unit as claimed in claim 1, wherein the recess is constructed to receive precisely one portion capsule, wherein the recess has a depositing means for depositing the portion capsule in a removal position and a carrier means for carrying the portion capsule during a pivot movement of the transport means into a discharge position.

3. The magazine unit as claimed in claim 1, wherein the transport means is constructed in a drum-like manner, wherein the outer side is a covering face of the transport means for retaining the subsequent portion capsule in the storage magazine, wherein the recess has a carrier means which is constructed as a carrier face and a depositing means which is constructed as a depositing face.

4. The magazine unit as claimed in claim 1, wherein the recess is constructed in such a manner that the carrier face delimits the depositing face toward one side, wherein the transport means has an opening along the depositing face at a side opposite with respect to the carrier face in order to discharge the portion capsule to the brewing device in a discharge position.

5. A brewing system having a magazine unit as claimed in claim 1 and a brewing device having a brewing chamber for extracting and/or releasing a substance, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

6. A method for providing a brewing device with a portion capsule, comprising in a first method step portion capsules are stacked in a storage magazine for storage in a stacking direction, in a second method step a portion capsule is retained by an outer side of a transport means in the form of a drum in the storage magazine, in a third method step the portion capsule is moved in a removal position of the transport means into a recess of the transport means, in a fourth method step the portion capsule is moved into the brewing device in a discharge position of the transport means in order to charge the brewing device, wherein the transport means is pivoted about a pivot axis which is arranged perpendicularly to the stacking direction between the removal position and the discharge position.

7. The method as claimed in claim 6, wherein a subsequent portion capsule is simultaneously retained by the outer side of the transport means during a pivot movement of the transport means between the removal position and the discharge position.

8. The method as claimed in claim 6, wherein the portion capsule is moved in the third method step into the recess of the transport means in such a manner that a capsule base of the portion capsule comes to rest on a depositing means of the recess, wherein the portion capsule is guided during a pivot movement from the removal position into the discharge position by a carrier means of the transport means.

9. The method as claimed in claim 7, wherein the portion capsule is moved in the third method step into the recess of the transport means in such a manner that a capsule base of the portion capsule comes to rest on a depositing face of the recess, wherein the portion capsule is guided during the pivot movement from the removal position into the discharge position by a carrier face.

10. The magazine unit as claimed in claim 3, wherein the recess is constructed to receive precisely one portion capsule, wherein the recess has the depositing face, for depositing the portion capsule in a removal position and a carrier means for carrying the portion capsule during a pivot movement of the transport means into a discharge position.

11. The magazine unit as claimed in claim 2, wherein the transport means is constructed in a drum-like manner, wherein the outer side is a covering face of the transport means for retaining the subsequent portion capsule in the storage magazine, wherein the recess has a carrier means which is constructed as a carrier face and a depositing means which is constructed as a depositing face.

12. The magazine unit as claimed in claim 2, wherein the recess is constructed in such a manner that the carrier face delimits the depositing face toward one side, wherein the transport means has an opening along the depositing face at a side opposite with respect to the carrier face in order to discharge the portion capsule to the brewing device in the discharge position.

13. A brewing system having a magazine unit as claimed in claim 1 and a brewing device having a brewing chamber for extracting and/or releasing coffee, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

14. The magazine unit as claimed in claim 2, wherein (a) the transport means is constructed in a drum-like manner, wherein the outer side is a covering face of the transport means for retaining the subsequent portion capsule in the storage magazine, wherein the recess has a carrier means which is constructed as a carrier face and a depositing means which is constructed as a depositing face; and (b) that the recess is constructed in such a manner that the carrier face delimits the depositing face toward one side, wherein the transport means has an opening along the depositing face at a side opposite with respect to the carrier face in order to discharge the portion capsule to the brewing device in the discharge position.

15. A brewing system having a magazine unit as claimed in claim 2 and a brewing device having a brewing chamber for extracting and/or releasing a substance, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

16. The magazine unit as claimed in claim 3, wherein the recess is constructed in such a manner that the carrier face delimits the depositing face toward one side, wherein the transport means has an opening along the depositing face at a side opposite with respect to the carrier face in order to discharge the portion capsule to the brewing device in a discharge position.

17. A brewing system having a magazine unit as claimed in claim 3 and a brewing device having a brewing chamber for extracting and/or releasing coffee, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

18. A brewing system having a magazine unit as claimed in claim 4 and a brewing device having a brewing chamber for extracting and/or releasing a substance, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

19. A magazine unit for providing a brewing device with a portion capsule comprising (a) a storage magazine having a plurality of magazine tubes, which are arranged on a rotary plate carrier having a permeable portion under each magazine tube, for storing portion capsules that contain coffee, wherein the portion capsules are stacked one after the other in a stacking direction and the magazine tubes are selectively movable with the carrier into a transfer position; and (b) a transport means for transporting a lower-most portion capsule of a magazine tube from the storage magazine into the brewing device, wherein the transport means is arranged under the permeable portion in the transfer position and is pivotable about a pivot axis which is arranged perpendicularly to the stacking direction, wherein the transport means has a recess for receiving precisely one portion capsule, wherein the transport means is constructed in a drum-like manner, wherein there is an outer side which is a covering face of the transport means in order to retain a subsequent portion capsule in the storage magazine, wherein the recess has a carrier means which is constructed as a carrier face and a depositing means which is constructed as a depositing face.

* * * * *

UNITED STATES PATENT AND TRADEMARK OFFICE
CERTIFICATE OF CORRECTION

PATENT NO. : 9,834,370 B2
APPLICATION NO. : 14/767817
DATED : December 5, 2017
INVENTOR(S) : Daniel Fischer It is certified that error appears in the above-identified patent and that said Letters Patent is hereby corrected as shown below:

On the Title Page

Below Abstract, replace "19 Claims, 5 Drawing Sheets" with --17 Claims, 5 Drawing Sheets--.

In the Claims

Please replace the claims at Column 11, Line 42 through Column 14, Line 56 with the following:

--1. A magazine unit for providing a brewing device with a portion capsule comprising:
(a) a storage magazine for storing portion capsules, wherein the portion capsules are stacked one after the other in a stacking direction; and
(b) a transport means for transporting a portion capsule from the storage magazine into the brewing device,
wherein the transport means is pivotable about a pivot axis which is arranged perpendicularly to the stacking direction,
wherein the transport means has a recess for receiving a portion capsule, wherein the transport means is constructed in a drum-like manner,
wherein there is an outer side which is a covering face of the transport means in order to retain a subsequent portion capsule in the storage magazine,
wherein the recess has a carrier means which is constructed as a carrier face and a depositing means which is constructed as a depositing face,
wherein the storage magazine has a plurality of magazine tubes which are arranged on a carrier,
wherein one or more magazine tubes are provided for stacking the portion capsules in the stacking direction,
wherein the magazine tubes are selectively movable with the carrier into a transfer position,
wherein the carrier has a permeable portion under each magazine tube, and
wherein the transport means for transporting a lowermost portion capsule from the storage magazine to the brewing device is arranged under the permeable portion in the transfer position.

Signed and Sealed this
Nineteenth Day of November, 2019

Andrei Iancu
*Director of the United States Patent and Trademark Office*

2. The magazine unit as claimed in claim 1, wherein the recess is constructed to receive precisely one portion capsule, wherein the recess has the depositing means for depositing the portion capsule in a removal position and the carrier means for carrying the portion capsule during a pivot movement of the transport means into a discharge position.

3. The magazine unit as claimed in claim 1, wherein the recess is constructed in such a manner that the carrier face delimits the depositing face toward one side, wherein the transport means has an opening along the depositing face at a side opposite with respect to the carrier face in order to discharge the portion capsule to the brewing device in a discharge position.

4. A brewing system having a magazine unit as claimed in claim 1 and a brewing device having a brewing chamber for extracting and/or releasing a substance, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

5. A method for providing a brewing device with a portion capsule, comprising in a first method step portion capsules are stacked in a storage magazine for storage in a stacking direction, in a second method step a portion capsule is retained by an outer side of a transport means in the form of a drum in the storage magazine, in a third method step the portion capsule is moved in a removal position of the transport means into a recess of the transport means, in a fourth method step the portion capsule is moved into the brewing device in a discharge position of the transport means in order to charge the brewing device, wherein the transport means is pivoted about a pivot axis which is arranged perpendicularly to the stacking direction between the removal position and the discharge position.

6. The method as claimed in claim 5, wherein a subsequent portion capsule is simultaneously retained by the outer side of the transport means during a pivot movement of the transport means between the removal position and the discharge position.

7. The method as claimed in claim 5, wherein the portion capsule is moved in the third method step into the recess of the transport means in such a manner that a capsule base of the portion capsule comes to rest on a depositing means of the recess, wherein the portion capsule is guided during a pivot movement from the removal position into the discharge position by a carrier means of the transport means.

8. The method as claimed in claim 6, wherein the portion capsule is moved in the third method step into the recess of the transport means in such a manner that a capsule base of the portion capsule comes to rest on a depositing face of the recess, wherein the portion capsule is guided during the pivot movement from the removal position into the discharge position by a carrier face.

9. The magazine unit as claimed in claim 3, wherein the recess is constructed in such a manner that the carrier face delimits the depositing face toward one side, wherein the transport means has an opening along the depositing face at a side opposite with respect to the carrier face in order to discharge the portion capsule to the brewing device in the discharge position.

10. A brewing system having a magazine unit as claimed in claim 1 and a brewing device having a brewing chamber for extracting and/or releasing coffee, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

11. A brewing system having a magazine unit as claimed in claim 1 and a brewing device having a brewing chamber for extracting and/or releasing a substance, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

12. A brewing system having a magazine unit as claimed in claim 2 and a brewing device having a brewing chamber for extracting and/or releasing coffee, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

13. A brewing system having a magazine unit as claimed in claim 3 and a brewing device having a brewing chamber for extracting and/or releasing a substance, which is provided in a portion capsule, wherein the brewing chamber has a first brewing chamber element and a second brewing chamber element and the first brewing chamber element is movable between a loading position, in which the first brewing chamber element and the second brewing chamber element are spaced apart from each other, and an extraction position, in which the first brewing chamber element and the second brewing chamber element are moved toward each other in order to form a substantially closed brewing chamber.

14. A magazine unit for providing a brewing device with a portion capsule comprising (a) a storage magazine having a plurality of magazine tubes, which are arranged on a rotary plate carrier having a permeable portion under each magazine tube, for storing portion capsules that contain coffee, wherein the portion capsules are stacked one after the other in a stacking direction and the magazine tubes are selectively movable with the carrier into a transfer position; and (b) a transport means for transporting a lower-most portion capsule of a magazine tube from the storage magazine into the brewing device, wherein the transport means is arranged under the permeable portion in the transfer position and is pivotable about a pivot axis which is arranged perpendicularly to the stacking direction, wherein the transport means has a recess for receiving precisely one portion capsule, wherein the transport means is constructed in a drum-like manner, wherein there is an outer side which is a covering face of the transport means in order to retain a subsequent portion capsule in the storage magazine, wherein the recess has a carrier means which is constructed as a carrier face and a depositing means which is constructed as a depositing face.

15. The method as claimed in claim 5, wherein the outer side is a covering face of the transport means for retaining the subsequent portion capsule in the storage magazine, wherein the recess has a carrier means which is constructed as a carrier face and a depositing means which is constructed as a depositing face.

16. The method as claimed in claim 15, wherein the recess is constructed to receive precisely one portion capsule, wherein the recess has the depositing face, for depositing the portion capsule in a removal position and the carrier means for carrying the portion capsule during a pivot movement of the transport means into a discharge position.

17. The method as claimed in claim 15, wherein the recess is constructed in such a manner that the carrier face delimits the depositing face toward one side, wherein the transport means has an opening along the depositing face at a side opposite with respect to the carrier face in order to discharge the portion capsule to the brewing device in a discharge position.--